Sept. 22, 1959 E. ATTI 2,905,855

IMAGE DISPLAY SYSTEM

Filed June 24, 1957 2 Sheets-Sheet 1

INVENTOR
Eros Atti
BY J J Callahan
ATTORNEY 2,905,855
Patented Sept. 22, 1959

2,905,855

IMAGE DISPLAY SYSTEM

Eros Atti, Breeseport, N.Y., assignor to Westinghouse Electric Corporation, East Pittsburgh, Pa., a corporation of Pennsylvania Application June 24, 1957, Serial No. 667,628
12 Claims. (Cl. 315—26)

This invention relates to the reproduction of television images and the like and, more particularly, to an image display system employing video modulated deflection of the image scanning spot.

This application is a continuation-in-part of my application Serial No. 613,995 for an Image Display System, filed October 4, 1956, now abandoned.

Various image display systems have been proposed in which use is made of a constant amplitude wobble or oscillation of the image scanning spot in an attempt to suppress the objectionable line structure in reproduced pictures. This objectionable line structure is apparent particularly in large screen television displays. In image displays of the above type, however, since the image spot size is usually a function of spot brightness, the interline gap is smaller in the high lights than in the low lights of the reproduced image. Thus, the amplitude of the wobble or oscillation is correct only for a certain brightness level, for example, the average level. The amplitude of the wobble will be too small in the image low lights with the consequence that the dark interline structure will not be fully suppressed, while at the same time, it will be too large in the image high lights with the consequence of creating a bothersome bright line structure due to the overlap of adjacent lines.

It is, therefore, an object of this invention to provide an image display system wherein scanned image lines are lines of constant width in spite of the size of the scanning spot.

It is another object of this invention to provide an image display system wherein the horizontal dark interline pattern which breaks up the vertical continuity of a reproduced image, particularly in low brightness areas, is suppressed.

It is still another object of this invention to provide an image display system wherein the horizontal bright line pattern which breaks up the vertical continuity of a reproduced image, particularly in high brightness areas, is suppressed.

It is a still further object of this invention to provide an image display system wherein a video modulated high frequency deflection of the image scanning beam is utilized to obtain constant width scanned image lines and suppression of both the dark interline and bright line patterns of a reproduced image.

It is a still further object of this invention to provide an auxiliary deflection wave circuit for generating a video modulated deflection wave form, the amplitude variations of which occur in opposite direction to the variations in the size of the image scanning spot.

These and other objects are effected by my invention as will appear from the following description taken in accordance with the accompanying drawings throughout which like reference characters indicate like parts, and in which.

Figures 3, 4, 8:
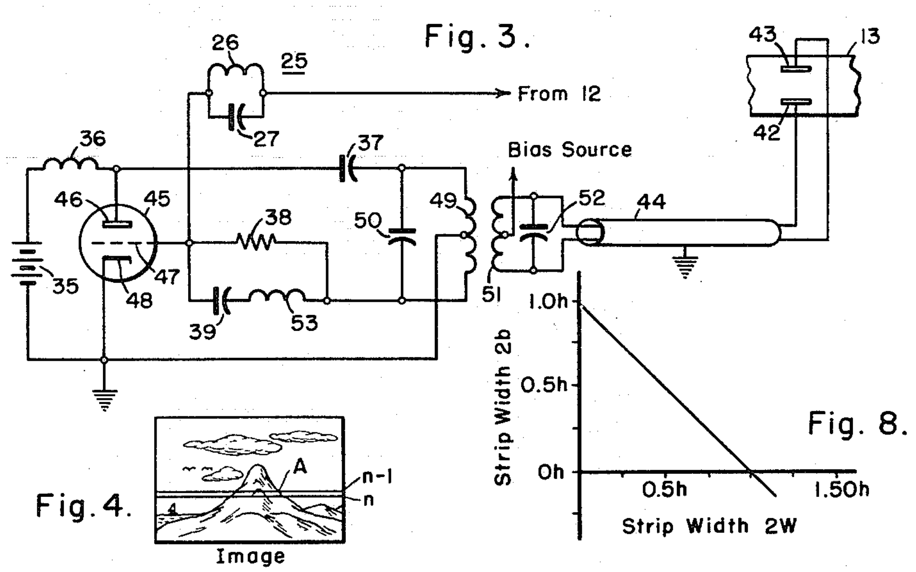
Fig. 3 is a schematic diagram of another circuit which may be used in conjunction with my invention.
Fig. 4 shows an image of a scene reproduced by the cathode ray tube of the television receiver.
Figure 7:
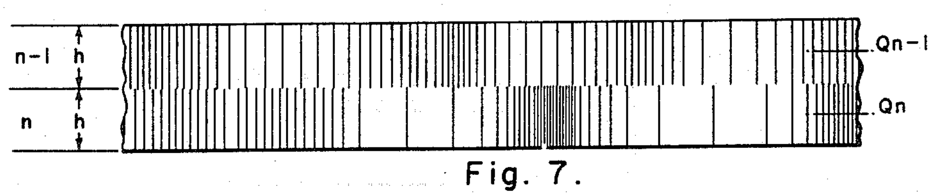

Fig. 7 shows a magnified view of the texture of the same detail, designated A, belonging to the image shown in Fig. 4 as obtained by my image display system which utilizes scanned image lines of constant width; and Fig. 8 shows the relationship between unexcited and excited widths of the elementary viewing screen area or strip allocated for each image line which occurs in an image display system utilizing a variable size image scanning spot.

Figure 1:
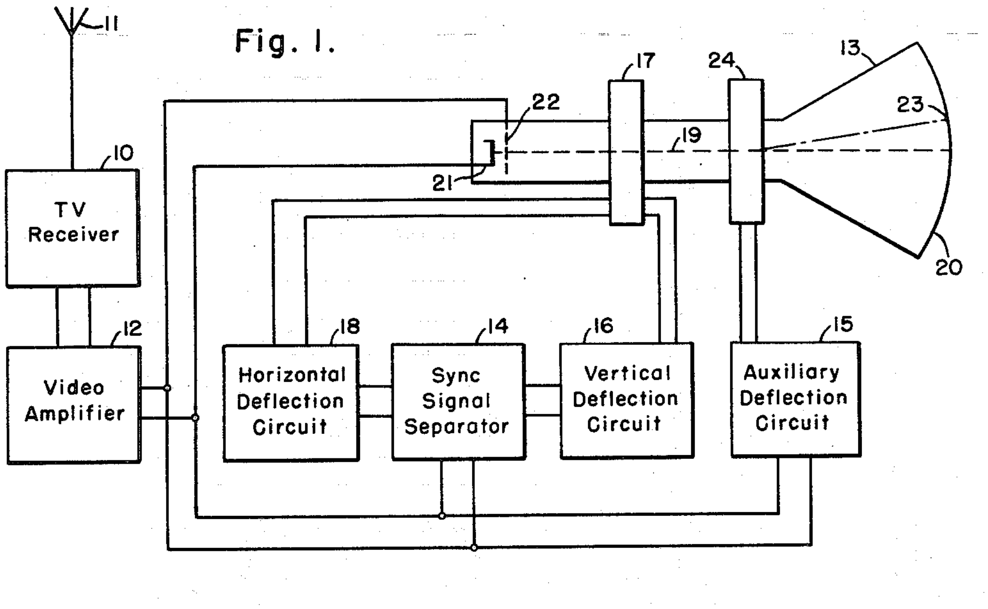
Figure 1 is an overall block diagram of an embodiment of my invention as applied to a television receiver which displays television images formed by scanned image lines of constant width.

Referring to Fig. 1 in detail, a television receiver 10 is connected to an antenna 11 for the reception of composite television signals. The television receiver 10 may be conventional and comprise the usual television signal amplifying and detecting apparatus.

Accordingly, it will be understood that there may be derived from the receiver 10 video signals which are applied to a video amplifier 12 wherein these signals are amplified. The video signals are coupled to an image reproducing device such as a cathode ray tube 13, a synchronizing signal separator 14, and an auxiliary deflection circuit 15.

The synchronizing signal separator 14 removes the horizontal and vertical synchronizing signals from the composite video signal and amplifies and separates these signals. The vertical synchronizing signals are applied to a vertical deflection circuit 16 which generates the necessary deflection signal for the vertical deflection winding of the yoke 17 associated with the cathode ray tube 13. Correspondingly, the horizontal synchronizing signals from the synchronizing signal separator 14 are applied to the horizontal deflection circuit 18 which, in turn, excites the horizontal deflection winding of the deflection yoke 17 with an appropriate deflection signal.

The cathode ray tube 13 includes an assemblage of electrodes known as an electron gun. The electron gun produces and forms an electron beam 19 which is deflected by means of the deflection yoke 17 to form an image scanning spot at the target area or screen 20 of the cathode ray tube. The electron gun comprises among its various electrodes, a cathode and control grid 21 and 22 respectively.

The video signals from the video amplifier 12 are applied between the cathode and control grid 21 and 22 respectively of the cathode ray tube 13 and modulate in intensity the electron beam 19 which is suitably focused upon the screen 20 into an image scanning spot 23 of variable luminous intensity. The video signals from the video amplifier 12 are also applied to the auxiliary deflection circuit 15 where they amplitude modulate a high frequency carrier generated in the circuit 15 to produce a video modulated carrier wave which is applied to an auxiliary deflection means 24. The auxiliary deflection means 24 being so energized operates to deflect the electron beam 19 in a direction transverse to the direction of scanning effected by deflection of the electron beam by means of the deflection yoke 17. The carrier generated in the auxiliary deflection circuit 15 may have a frequency in the high frequency, very high or ultra high frequency spectrum. The envelope of the video modulated carrier wave produced by the auxiliary deflection circuit 15 will be a function of the video signals and of the characteristics of the cathode ray tube 13.

The deflection yoke 17 acts to deflect the electron beam 19 to scan upon the screen 20, an image in two interlaced fields, in accordance with usual electronic scanning techniques.

The variations in the video modulated carrier's amplitude are such that they compensate for the variations which occur in the vertical size of the image scanning spot 23, in consequence of the current modulation of the beam 19, so that the spot 23 excites upon the viewing screen 20 an elementary phosphor area or strip of substantially constant width.

The proper modulation envelope required to match the variations in the size of the spot 23 occurring in the wide range of luminous intensities displayed by the spot as it passes from the darkest to the brightest areas of the image, may be achieved by taking advantage of the linear and non-linear regions of operation available in electron devices.

The bandwidth of the video modulated carrier may be the full video bandwidth or a part of it.

The output of the auxiliary deflection circuit 15 is applied to the auxiliary deflection means 24 to rapidly deflect or wobble the image scanning spot 23 while it traces the lines of the image. The deflection or wobble is in a direction transverse to the scanning direction. The auxiliary deflection means 24 may be either a deflection coil as shown in Fig. 1 or electrostatic deflection electrodes such as shown in Fig. 2.

Figure 2:
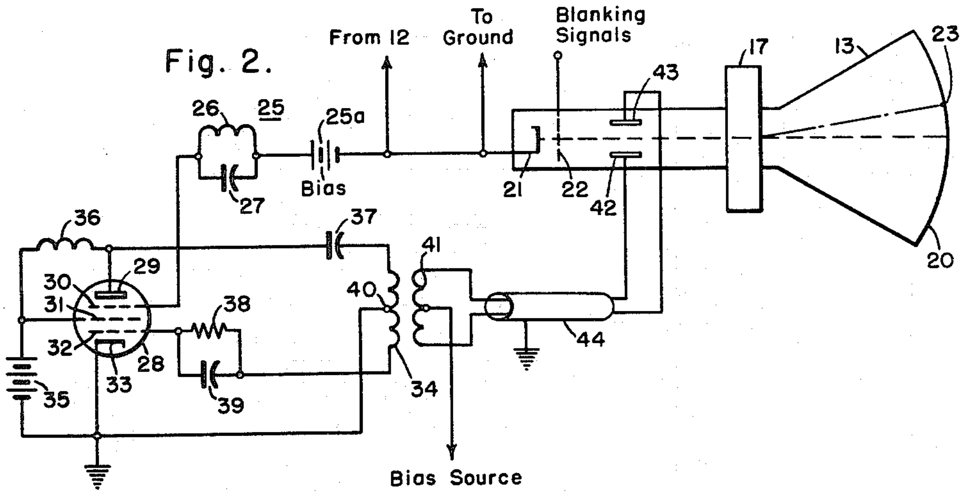
Fig. 2 is a schematic diagram of a circuit which may be used in conjunction with my invention.

In Fig. 2 there is illustrated an embodiment of my invention as applied to a television receiver employing cathode drive of the cathode ray picture tube. This type of drive is commonly used in television receivers manufactured in this country. Referring to Fig. 2 in detail, the video signal from the video amplifier 12 is applied to the cathode ray tube 13 while the control grid 22 receives only the blanking signals. The cathode 21 may be connected to ground potential through a brightness control element. Since the polarity of the video signal is negative in respect to ground, the beam current constituting the image scanning spot 23 will increase as the video signal becomes more negative.

The video signal from the video amplifier 12 is also applied through a trap circuit 25 comprising the inductor 26 and the capacitor 27 to the auxiliary deflection wave circuit 15. The trap circuit 25 keeps the carrier wave generated in circuit 15 from interfering with the video signal applied to the cathode 21 of the cathode ray tube 13.

The auxiliary deflection wave circuit 15 comprises a modulated oscillator which includes a vacuum tube, shown as pentode 28 provided with anode 29, suppressor grid 30, screen grid 31, control grid 32, and cathode 33. A source of voltage supply 25*a* of suitable amplitude and polarity applies a bias to the suppressor grid 30. An oscillator coil 34 is connected between the anode 29 and control grid 32 of pentode 28. The coil 34 constitutes with its distributed capacity an oscillator circuit resonant at the desired frequency of the generated carrier.

In the specific oscillator circuit shown, anode 29 and screen grid 31 are supplied with potential from the positive terminal of a suitable source of unidirectional potential 35. The negative terminal of potential source 35 is at ground potential. A choke coil 36 is connected between the positive terminal of potential source 35 and the anode 29. The anode 29 is also connected through a capacitor 37 to one end of oscillator coil 34, the other end of which is connected through a parallel circuit comprising a resistor 38 and a capacitor 39 to the control grid 32. Resistor 38 and capacitor 39 provide proper grid bias by means of grid-leak action. The cathode 33 is connected to ground potential and also to a point 40 on the oscillator coil 34. The capacitor 37 prevents the D.C. anode current from returning to the cathode 33 through the oscillator coil 34 while the choke coil 36 prevents any oscillations from appearing in the potential source 35.

The oscillator circuit of Fig. 2 is of Hartley type. But is will be understood that any suitable oscillator circuit may be used, and my invention is not limited to the oscillator circuits described.

In the operation of auxiliary deflection circuit 15 a portion of the oscillating voltage developed by the oscillator circuit comprising the coil 34 is fed back to the control grid 32 of the tube 28 to sustain the oscillations developed. The video signal from the video amplifier 12 is applied to the suppressor grid 30 of tube 28 to modulate the amplitude of the developed oscillations in accordance with the video signal. Since the video signal is negative with respect to ground, an increase in video signal amplitude produces a decrease in the amplitude of the oscillations. By a suitable choice of the parameters involved in tube 28 and associated circuit components, an increase in the size of the image scanning spot 23 will be accompanied by a corresponding proper decrease in the amplitude of the oscillations of the carrier wave and vice versa. In particular, the variations in the developed carrier's amplitude may equal the variations in the vertical size of the image scanning spot 23, that is, the variations in the size in the spot 23 in the direction of the height of the reproduced image.

A coupling coil 41 feeds the video modulated carrier wave developed in the auxiliary deflection circuit 15 to auxiliary deflection means which comprise deflection electrodes 42 and 43. A shielded cable 44 connects the coupling coil 41 and the electrodes 42 and 43. The circuit comprising the coupling coil 41, electrodes 42 and 43 and cable 44 may be tuned to resonate substantially at the frequency of the video modulated carrier. From a point on the coupling coil 41 a connection may be made to a suitable source of bias for the deflection electrodes 42 and 43.

In Fig. 3, the auxiliary deflection circuit comprises a vacuum tube shown as triode 45, provided with anode 46, control grid 47 and cathode 48. The oscillator circuit comprises an oscillator coil 49 and a capacitor 50 connected in parallel between the anode 46 and the control grid 47 of the triode 45. The oscillator circuit is tuned to the frequency of the desired carrier. The video signal from the video amplifier 12 is applied to the control grid 47 and superimposed upon the carrier signal fed back to the control grid 47 by the oscillator circuit. A parallel resonant coupling circuit comprising the coil 51 and the capacitor 52, which is tuned at substantially the desired carrier frequency, couples the video modulated carrier wave to the deflection electrodes 42 and 43 by means of the cable 44. The inductor 53 in the grid circuit of the triode 45 has the purpose of equalizing the grid impedance throughout the video bandwidth. The capacitor 39 and inductor 53 are made to resonate at the desired frequency of the carrier developed by the auxiliary deflection circuit 15.

Figure 5:
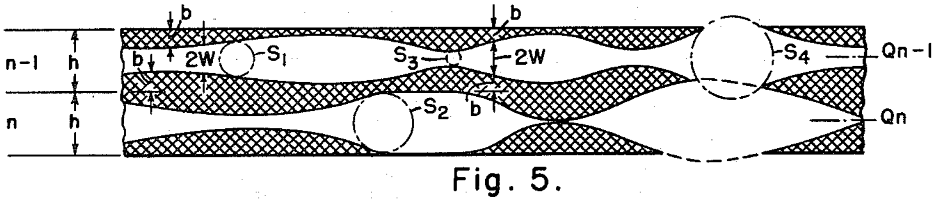
Fig. 5 shows a magnified view of the texture of a detail, designated A, belonging to the image shown in Fig. 4, as obtained by a conventional image display system which utilizes scanned image lines of variable width.
Figure 6:
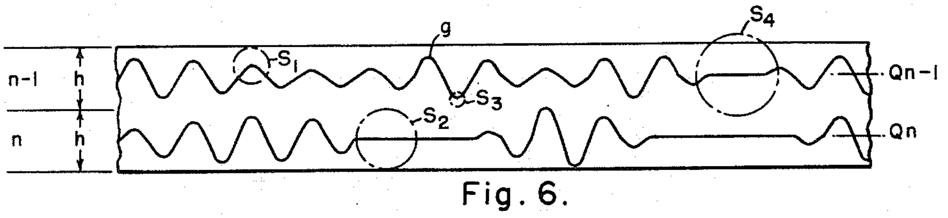
Fig. 6 shows a sample of the modulated high frequency carrier used to deflect transversely the electron beam during the scanning of the identical image detail represented in Fig. 5.

An example of the video modulated carrier wave developed by the circuits of Figs. 2 and 3 and corresponding to the picture detail designated A in Fig. 4 and shown magnified in Fig. 5, is shown in Fig. 6. By applying the video modulated carrier wave to suitable auxiliary deflection means such as the deflection electrodes 42 and 43 of Fig. 2, the picture detail A of Fig. 5 will assume the appearance shown in Fig. 7. In Figs. 5, 6 and 7, $Qn-1$ and $Qn$ are the axes of the elementary areas or strips of the screen 20 of the cathode ray tube 13 which are allocated for the two generic image lines $n-1$ and $n$, and $h$ represents the height of the screen 20 which is allocated for each line of the reproduced image. The various circular characters designated S1, S2, S3 and S4 in Figs. 5 and 6 represent the same image scanning spot during the different positions occupied by it upon the image lines in different moments. In Fig. 6, the line designated $g$ represents the trajectory of the center of the image scanning spot.

A feature of my invention is the suppression of the "dark" and "dark and bright" line patterns displayed respectively by present art image reproducing systems utilizing a non-wobbled and wobbled scanning spot respectively.

As is well known, a television image is composed of a certain number of active lines, about 490 out of the 525 line image standard in this country. These lines are sequentially scanned at a rate of 15,750 lines per second in 60 interlaced fields which constitute 30 complete images per second. The height $h$ of viewing screen allocated for each image line is:

$$h=\frac{H}{N}$$

where $H$=height of image, $N$=number of active image lines.

If the image scanning spot excites only partially the width $h$ of this elementary area or strip on the screen of the cathode ray tube, there will be unexcited areas in said strip which will show up by contrast in the image as a horizontal dark line pattern. On the other hand, when the image scanning spot excites an elementary area or strip of the viewing screen somewhat wider than $h$, there will be overlapping of adjacent image lines which will most likely show up in the image as a horizontal bright line pattern. Both of these patterns are deterimental to the reproduced image since they cause loss in the vertical resolution of the image, when viewed at a close distance, or cause an apparent reduction in the size of the image, when it is viewed at the distance required to suppress these patterns.

The dark line pattern was not bothersome before the advent of large size viewing screen and the small size image scanning spots available in modern image reproducing tubes. The dark line pattern is basically due to the mismatch between the size of the elementary viewing screen strip allocated for each image line and the size of the image scanning spot which traces the image lines. It is mainly for the above reasons that the general aspect of any detail reproduced in the image by present image reproducing systems is normally that of a series of alternate dark and bright variable width horizontal lines as illustrated in Fig. 5. As shown in Fig. 5, a bright central portion of an image line having a width designated as $2w$ is adjacent to two dark portions of the image line each one having a width designated as $b$. The bright central portion of the image line is the portion excited by the image scanning spot and, since the spot has variable size, the widths $2b$ and $2w$ vary also. The sum of $2b$ plus $2w$ equals $h$ and is constant. This dependence of the image spot size upon beam current is caused by several factors such as the effect of the beam current space charge upon focus, upon beam-crossover size, and by the mechanism of beam current control in present day electron guns. The latter mechanism involves that the area of the cathode surface emitting electrons to form the beam does not remain constant but varies with beam current. Said cathode surface area varies as if an iris were placed in front of the cathode, restricting the cathode area as the beam current becomes smaller.

The size of the image scanning spot, which may be considered as an image of said cathode surface, may thus vary by a large factor, say 10 to 20 or more, passing from the dark details to the bright details existing in an average image.

The unexcited width $2b=h-2w$ expressed as a function of the excited width $2w$ of the elementary area or strip of viewing screen allocated for each image line, is graphically represented in Fig. 8. The quantities $2b$ and $2w$ are expressed in uits of $h$.

Referring to Fig. 8 in detail, it is seen that the unexcited width $2b$ attains its maximum value $2b=h$ in the image areas of minimum brightness, where the size of the image scanning spot becomes negligible, and attains its minimum value in the image areas of peak brightness, where the image scanning spot assumes its largest size. It may be equal to zero at a certain brightness level which will depend upon the size of the viewing screen for a given electron gun. Beyond said brightness level, the image scanning spot is oversized and the image lines overlap with the possible formation of the bright line pattern heretofore described. The amplitude of the modulated carrier used to deflect the image scanning spot may therefore vary between a maximum value equal to approximately the half width 0.5 $h$ of the allocated phosphor elementary area or strip, in the darkest area of the image, and a minimum value correspondingly to the width $b$ of the unexcited strip existing in the peak lights of the image, in the absence of image scanning spot wobble deflection.

In those image areas where there is no unexcited areas or strips because the vertical size of the image scanning spot is equal or larger than $h$, the carrier amplitude will be equal to zero.

In prior art image reproducing systems utilizing image spot wobble deflection the dark line or interline pattern may be only partially suppressed by means of an unmodulated high frequency carrier, because these systems are effective only in those areas of the image having average level brightness for which the amplitude of the carrier has been adjusted. A more serious limitation of image reproducing systems of this type lies in the fact that the bright line pattern displays itself in the high lights of the image, while the dark line pattern still is substantially present in the low lights of the image. In my image reproducing system utilizing a video modulated carrier, such a limitation is entirely eliminated.

It is to be understood that the present invention may be practiced by using the video modulated intermediate frequency carrier wave present in the intermediate frequency stage of the television receiver 10 to effect the desired spot wobble deflection in place of generating a carrier wave and then subsequently modulating it with the video signals or information. Specifically, a video modulated intermediate frequency carrier wave may be obtained in a direct manner from the final intermediate frequency amplifier stage or from a separate voltage amplifier with a comparatively narrow bandwith. And, if a greater stability is desired in the intermediate frequency amplifier, a combined oscillator-mixer may be used to convert the video modulated intermediate frequency carrier wave to some other frequency.

The converted intermediate frequency carrier wave may carry the same modulation as the video modulated intermediate frequency carrier wave in order to prevent direct feedback to the front of the intermediate frequency amplifier. The intermediate frequency carrier wave or signal is directly suitable for wobble spot size compensation with negatively modulated video signals; however, even positively modulated video signals may be used to effect this compensation after suitable conversion. This conversion may be effected, for example, by applying a continuous wave (C.W.) to an amplifier of the video modulated signals.

It is also within the scope of the present invention to utilize horizontal and vertical parabolic waveforms to compensate for defocusing of the scanning spot which may occur at the edges and corners of the raster. These compensations may be effected by modulating the auxiliary deflection or wobbling signal with such parabolic waveforms. And, these horizontal and vertical spot size compensations may be used together or separately.

While I have shown my invention in several embodiments it will be obvious to those skilled in the art that it is not so limited but is susceptible to various changes and modifications without departing from the spirit thereof. For instance, when grid drive of the television picture tube is used instead of cathode drive the video signal will be of reversed polarity and the beam current will increase with an increasing positive amplitude of the video signal. This positive amplitude signal can be directly used to obtain the desired modulations of the carrier by being applied to the cathode of tube 28 or 45 of Figs. 2 and 3 respectively, rather than to the control grid of these tubes. Also, it is to be understood that my invention may be extended to applications other than the reproduction of television images.

I claim as my invention:

1. An image display system comprising a source of image signals connected to an image display device having a target area and means for producing an image scanning spot of varying size, means for moving said image scanning spot in first and second orthogonal directions over said target area to form a plurality of scanning lines, with the motion in said first orthogonal direction being more rapid than the motion in said second direction, means connected to said source of image signals for generating a scanning wave characterized in that an increase or decrease in the size of said image scanning spot is accompanied by a corresponding decrease or increase respectively in the amplitude of said scanning wave, and means energized by said scanning wave for rapidly moving said image scanning spot over said target area in a direction transverse to said first orthogonal direction whereby each of said scanning lines has a substantially constant width.

2. An image display system comprising an image display device having a target area, said image display device having means for generating an electron beam to form an image scanning spot of varying size on said target area, electron beam control means for deflecting said electron beam over said target area in a plurality of substantially parallel scanning lines, auxiliary beam control means for deflecting said electron beam over said target area in a direction transverse to the direction of said scanning lines, the amplitude of said last-named deflection varying with the size of said image scanning spot whereby each of said scanning lines has a substantially constant width.

3. An image display system comprising a cathode ray tube having a target area and means for generating an electron beam to form an image scanning spot at said target area, a source of video signals connected to said beam generating means for modulating said electron beam, the size of said image scanning spot varying with the modulation of said electron beam, main deflection means for said cathode ray tube, horizontal and vertical deflection wave circuits connected to said main deflection means for deflecting said electron beam over said target area in a plurality of scanning lines, auxiliary deflection means for said cathode ray tube, an auxiliary deflection wave circuit including means for generating a carrier wave, means coupling said source of video signals and said auxiliary deflection wave circuit for modulating said carrier wave as a function of said video signals, and means for applying the video modulated carrier wave to said auxiliary deflection means for deflecting said electron beam over said target area in a direction transverse to the direction of said scanning lines, the amplitude of said last-named deflection varying with the size of said image scanning spot whereby each of said scanning lines has a substantially constant width.

4. An image display system according to claim 3, in which the frequency of said video modulated carrier wave is between 3 mc. and 3000 mc.

5. An image display system according to claim 3, in which the bandwidth of said video modulated carrier is substantially equal to the bandwidth of the video signals.

6. An image display system comprising a cathode ray tube having a target area and means for generating an electron beam to form an image scanning spot at said target area, a source of video signals connected to said beam generating means for modulating said electron beam, the size of said image scanning spot varying with the modulation of said electron beam, main deflection means for said cathode ray tube, horizontal and vertical deflection wave circuits connected to said main deflection means for deflecting said electron beam over said target area in a plurality of scanning lines, auxiliary deflection means for said cathode ray tube, an auxiliary deflection wave circuit including means for generating a carrier wave, means coupling said source of video signals and said auxiliary deflection wave circuit for amplitude modulating said carrier wave as a function of said video signals to develop a video modulated carrier wave characterized in that an increase or decrease in the size of said image scanning spot is accompanied by a corresponding decrease or increase respectively in the amplitude of said video modulated carrier wave, and means for applying said video modulated carrier wave to said auxiliary deflection means for deflecting said electron beam over said target area in a direction transverse to the direction of said scanning lines so that each of said scanning lines has a substantially constant width in spite of variations in the size of said image scanning spot.

7. An image display system comprising a cathode ray tube having a target are and means for generating an electron beam to form an image scanning spot at said target area, a source of video signals connected to said beam generating means for modulating said electron beam, the size of said image scanning spot varying with the modulation of said electron beam, main deflection means for said cathode ray tube, horizontal and vertical deflection wave circuits connected to said main deflection means for deflecting said electron beam over said target area in a plurality of scanning lines, auxiliary deflection means for said cathode ray tube, an auxiliary deflection wave circuit comprising an electron discharge device for generating a carrier wave, said electron discharge device having at least a control grid and an output electrode, means coupling said source of video signals and said control grid of said electron discharge device for amplitude modulating said carrier wave as a function of said video signals to develop at said output electrode a video modulated carrier wave, said video modulated carrier wave being characterized in that an increase or decrease in the size of said image scanning spot is accompanied by a corresponding decrease or increase respectively in the amplitude of said video modulated carrier wave, and means for applying said video modulated carrier wave to said auxiliary deflection means for deflecting said electron beam over said target area in a direction transverse to said scanning lines so that each of said scanning lines has a substantially constant width in spite of variations in the size of said image scanning spot.

8. In a television receiver which employs a cathode ray tube having an electron beam forming an image scanning spot at the target area of said cathode ray tube, said image scanning spot varying in size as a function of the modulation of said electron beam by received video signals, and in which horizontal and vertical deflection means are associated with said cathode ray tube for deflecting the electron beam over said target area in a plurality of scanning lines, a circuit for generating a scanning wave to deflect said electron beam over said target area in a direction transverse to said scanning lines so that each of said scanning lines has a substantially constant width in spite of variations in the size of said image scanning spot, said scanning wave being characterized in that an increase or decrease in the size of said image scanning spot is accompanied by a corresponding decrease or increase respectively in the amplitude of said scanning wave, said circuit comprising, an electron discharge device for generating a carrier wave, said electron discharge device having at least a control grid and an output electrode, and means for applying received video signals to the control grid of said electron discharge device for amplitude modulating said carrier wave as a function of said received video signals to develop said scanning wave at said output electrode.

9. In a television receiver which employs a cathode ray tube having an electron beam forming an image scanning spot at the target area of said cathode ray tube, said image scanning spot varying in size as a function of the modulation of said electron beam by received video signals, and in which horizontal and vertical deflection means are associated with said cathode ray tube for deflecting the electron beam over said target area in a plurality of scanning lines, a circuit for generating a scanning wave to deflect said electron beam over said target area in a direction transverse to said scanning lines so that each of said scanning lines has a substantially constant width in spite of variations in the size of said scanning spot, said scanning wave being characterized in that an increase or decrease in the size of said image scanning spot is accompanied by a corresponding decrease or increase respectively in the amplitude of said scanning wave, said circuit comprising an electron discharge device for generating a carrier wave, said electron discharge device having at least a control grid, a suppressor grid and an output electrode, means for applying received video signals to said suppressor grid for amplitude modulating said carrier wave as a function of said received video signals to develop said scanning wave at said output electrode.

10. In a television receiver which employs a cathode ray tube having an electron beam forming an image scanning spot at the target area of said cathode ray tube, said image scanning spot varying in size as a function of the modulation of said electron beam by received video signals, and in which horizontal and vertical deflection means are associated with said cathode ray tube for deflecting the electron beam over said target area in a plurality of substantially parallel lines, a circuit for generating a scanning wave to deflect said electron beam over said target area in a direction transverse to said scanning lines so that each of said scanning lines has a substantially constant width in spite of variations in the size of said image scanning spot, said scanning wave being characterized in that an increase or decrease in the size of said image scanning spot is accompanied by a corresponding decrease or increase respectively in the amplitude of said scanning wave, said circuit comprising, an electron discharge device for generating a carrier wave, said electron discharge device having at least a control grid, a suppressor grid and an output electrode, means for applying said carrier wave to said suppressor grid, and means for applying received video signals to said control grid for amplitude modulating said carrier wave as a function of said received video signals to develop said scanning wave at said output electrode.

11. An image display system comprising a cathode ray tube having a target area and means for generating an electron beam to form an image scanning spot at said target area, a source of video signals connected to said beam generating means for modulating said electron beam, the size of said image scanning spot varying with the modulation of said electron beam, main deflection means for said cathode ray tube, horizontal and vertical deflection wave circuits connected to said main deflection means for deflecting said electron beam over said target area in a plurality of scanning lines, auxiliary deflection means for said cathode ray tube, a source of video modulated carrier wave characterized in that an increase or decrease in the size of said image scanning spot is accompanied by a corresponding decrease or increase respectively in the amplitude of said video modulated carrier wave, and means for applying said video modulated carrier wave to said auxiliary deflection means for deflecting said electron beam over said target area in a direction transverse to the direction of said scanning lines so that each of said scanning lines has a substantially constant width in spite of variations in the size of said image scanning spot.

12. In a television receiver adapted to receive a television signal comprising a video modulated carrier wave of a first frequency, and which comprises a cathode ray tube having a target area and means for generating an image scanning spot at said target area, a source of detected video signals connected to said beam generating means for modulating said electron beam, the size of said image scanning spot varying with the modulation of said electron beam, main deflection means for said cathode ray tube, horizontal and vertical deflection wave circuits connected to said main deflection means for deflecting said electron beam over said target area in a plurality of scanning lines, auxiliary deflection means for said cathode ray tube, a source of video modulated carrier wave of a second frequency characterized in that an increase or decrease in the size of said image scanning spot is accompanied by a corresponding decrease or increase respectively in the amplitude of said video modulated carrier wave of said second frequency, said second frequency being of lower value than said first frequency, and means for applying said video modulated carrier wave of said second frequency to said auxiliary deflection means for deflecting said electron beam over said target area in a direction transverse to the direction of said scanning lines so that each of said scanning lines has a substantially constant width in spite of variations in the size of said image scanning spot.

References Cited in the file of this patent

UNITED STATES PATENTS

| | | |
|---|---|---|
| 1,933,219 | Nakajima | Oct. 31, 1933 |
| 2,093,157 | Nakashima | Sept. 14, 1937 |
| 2,303,924 | Faudell | Dec. 1, 1942 |
| 2,586,395 | Taylor | Feb. 19, 1952 |
| 2,619,612 | Lawrence | Nov. 25, 1952 |
| 2,763,715 | Fromm | Sept. 18, 1956 |
| 2,784,342 | Overbeek | Mar. 5, 1957 |
| 2,798,114 | Schlesinger | July 2, 1957 |